H. C. DUTY.
NUT LOCK.
APPLICATION FILED MAY 15, 1914.
1,178,140.
Patented Apr. 4, 1916.
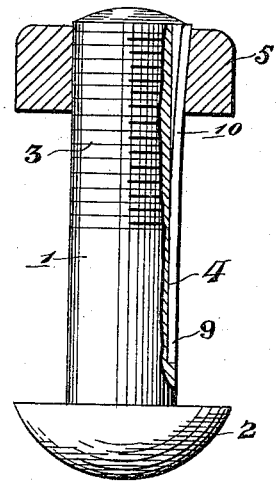
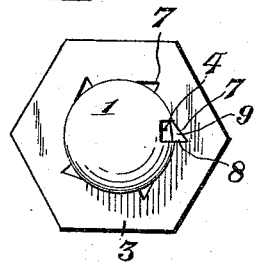
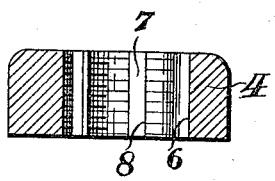
Witnesses
Edw. S. Hall.
Wm. H. Downing.
Inventor
Henry C. Duty.
By Richard Owen.
Attorney

UNITED STATES PATENT OFFICE.

HENRY C. DUTY, OF PITTSBURG, ILLINOIS.

NUT-LOCK.

1,178,140.  Specification of Letters Patent.  Patented Apr. 4, 1916.

Application filed May 15, 1914. Serial No. 838,833.

*To all whom it may concern:*

Be it known that I, HENRY C. DUTY, a citizen of the United States, residing at Pittsburg, in the county of Williamson and State of Illinois, have invented certain new and useful Improvements in Nut-Locks, of which the following is a specification.

My invention relates to nut locks.

The primary object of my invention resides in the provision of an improved means for locking a nut upon the bolt.

Another object of my invention resides in an improved resilient locking member carried by the bolt for engagement with a receiving means on the nut for allowing inward movement of the nut upon the bolt but which positively prevents outward movement of the same.

A further object of my invention resides in the novel construction of the locking member carried by the bolt and the means by which the same is mounted or positioned upon the bolt.

A still further object of my invention resides in the provision of a nut lock that is simple in construction, efficient in operation, and one that can be manufactured and placed upon the market at a minimum cost.

Other objects as well as the nature, characteristic features and scope of my invention will be more readily understood from the following description taken in connection with the accompanying drawings and pointed out in the claim.

In the drawings:—Figure 1 is an elevational view of a bolt partly in section showing to advantage the locking member in engagement with the nut, in section. Fig. 2 is a top plan view of the same. Fig. 3 is a transverse sectional view of the nut, and Fig. 4 is a fragmentary elevational view of the locking member.

Referring more particularly to the drawings in which similar reference numerals designate corresponding parts throughout the different views, I provide the shank 1 of the bolt with a head 2, the free end of the shank is screw threaded as at 3 and is further provided with a longitudinally extending groove 4, the opposite sides of which are arranged in parallelism with the longitudinal axis of the shank.

A nut 5 is screw threaded upon the free end of the shank by means of a centrally disposed screw threaded opening 6 therethrough, the latter being provided with a plurality of longitudinally extending grooves, of a width similar to the width of the groove 4 and has one side 7 arranged in tangential relation with the outer periphery of the shank and the opposite side 8 is arranged radially of the bolt.

For the purpose of securely locking the nut upon the bolt and for preventing accidental rotation of the same, I have soldered or otherwise rigidly mounted in the extreme inner end of the groove 4 in the bolt one end of a locking member 9 which in this instance consists of an elongated strip of resilient metal which is triangular in cross section throughout its length. The outer end of the locking member 9 is screw threaded as at 10 and is twisted in order that the enlarged longitudinal side edge which lies in alinement with the outer surface of the bolt at its inner end, will, at times, engage the transverse grooves in the nut, the outer or screw threaded surface 10, engaging the screw threads of the opening 6 and facilitating the turning of the nut besides engaging and conforming to the tangentially arranged faces 7 of the grooves in the nut and the enlarged longitudinal side edge of the strip bearing diagonally against the opposite radial face of one of the grooves in the nut which is arranged in parallelism with the longitudinal axis of the shank and forms an abutting shoulder, the narrow longitudinal side edge being arranged diagonal of and in biting engagement with one face or wall of the longitudinal groove in the bolt opposite to the radial wall of the groove in the nut with which the strip is arranged for preventing the outward rotation or accidental displacement of the nut from the bolt. It can be easily seen that because of the manner in which the locking member 9 is positioned within the groove 4 that after the same has been twisted the outer end thereof has a greater tendency to force itself outwardly and thus provides a strong spring action which greatly facilitates the efficiency of the device.

When it is desired to remove a nut from the bolt all that is necessary to do is for the user to place one of his hands (not shown) upon the upper end of the locking member and press the same inwardly against the spring tension of the same and place his other hand (not shown) upon the nut and rotate the nut upon the bolt. When the nut has reached the upper end of the bolt the locking member is released and the hand again engaged upon the locking member at a point beneath the lower or under surface of the nut and the rotation of the nut continued until it has been removed from the bolt. In placing the nut in position it can be easily seen that the arrangement of the threads and the positioning of the recesses allow the locking member to pass about the same, the tangentially arranged faces thereof bearing against the slanted screw threaded face of the locking strip greatly facilitates the inward or downward movement of the nut upon the bolt.

From the above description taken in connection with the accompanying drawings it can be readily seen that I have provided a device that is simple in construction containing but a few parts which can be easily and cheaply manufactured and when manufactured can be placed upon the market and sold at a minimum cost.

It will be understood that the above description and accompanying drawings comprehend only the general and preferred embodiment of my invention and that various minor changes in details of construction, proportion and arrangement of the parts may be made within the scope of the appended claim and without sacrificing any of the advantages of my invention.

Having thus fully described my invention what I claim as new and desire to secure by Letters Patent is:—

The combination with a bolt provided with a longitudinal groove and a nut threaded thereon and a plurality of longitudinal grooves in the inner periphery thereof, one side of each of said grooves being arranged in tangential relation with the outer surface of the bolt and the other side being arranged radially of the bolt, of an elongated resilient locking member snugly fitted and rigidly secured at the inner end of the groove and being arranged in alinement with the outer surface of the bolt, said member being triangular in cross section throughout its length for conforming to the shape of the grooves in the nut, said member being screw threaded on the outer half of the front face thereof for facilitating the rotation of the nut on the bolt, the enlarged longitudinal side edge of the screw threaded end of the member being twisted outwardly and diagonally engageable with the radial wall of one of the grooves in the nut, the front face of the twisted end of the member bearing against the slanting side of the groove, and the narrow longitudinal side edge of the member being arranged diagonally of and in biting engagement with one wall of the longitudinal groove in the bolt opposite to the radial wall of the longitudinal groove in the nut in which the member is engaged for preventing outward rotation and accidental displacement of the nut on and from the bolt.

In testimony whereof I affix my signature in presence of two witnesses.

HENRY C. DUTY.

Witnesses:
 THOS. J. SANDERS,
 LUTHER PRITCHETT.

Copies of this patent may be obtained for five cents each, by addressing the "Commissioner of Patents. Washington, D. C."